S. C. ROBERTS.
DEVICE FOR RETARDING THE DISCHARGE FROM SUCTION FANS AND THE LIKE.
APPLICATION FILED SEPT. 10, 1912.
1,074,743.
Patented Oct. 7, 1913.
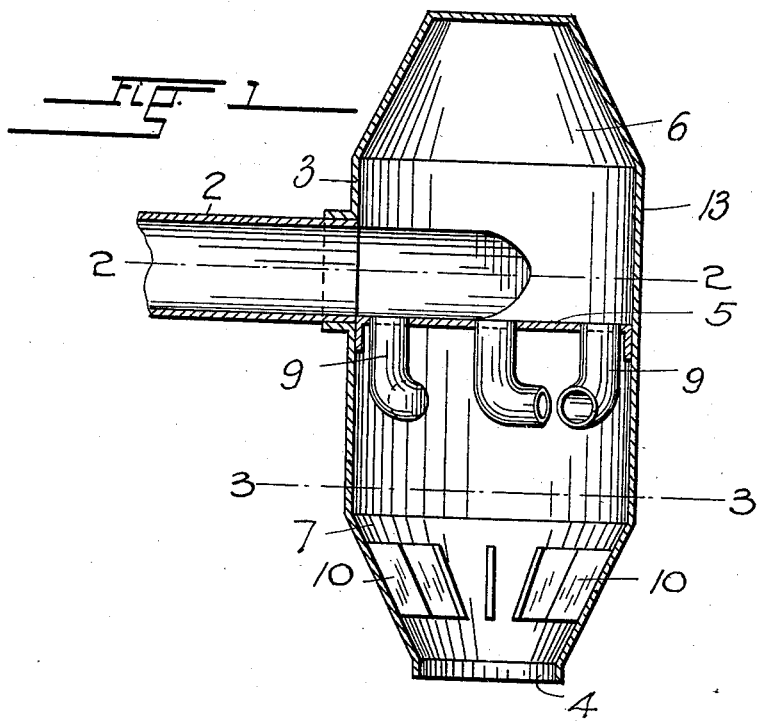
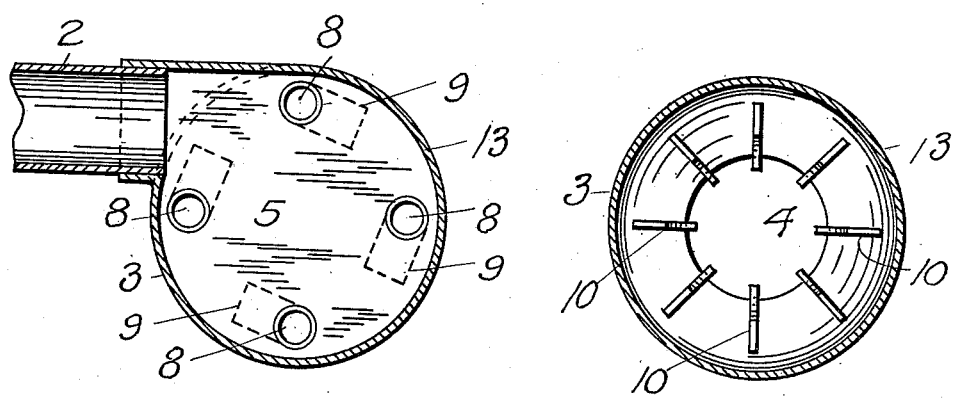
WITNESSES:
INVENTOR.
S. C. Roberts.
ATTORNEY.

UNITED STATES PATENT OFFICE.

SHERMAN C. ROBERTS, OF DENVER, COLORADO.

DEVICE FOR RETARDING THE DISCHARGE FROM SUCTION-FANS AND THE LIKE.

1,074,743.     Specification of Letters Patent.     Patented Oct. 7, 1913.

Application filed September 10, 1912. Serial No. 719,546.

*To all whom it may concern:*

Be it known that I, SHERMAN C. ROBERTS, a citizen of the United States, residing at Denver, in the county of Denver and State of Colorado, have invented certain new and useful Improvements in Devices for Retarding the Discharge from Suction-Fans and the like, of which the following is a specification.

This invention relates to a device for retarding the flow of material from the delivery conduit of a fan or other suction device.

When material such as alfalfa meal or the like is by means of a suction fan conveyed from the mill in which it is ground, to a point remote therefrom, it is impelled through the delivery conduit of the fan with considerable velocity. All products of this character contain light pulverous matter produced by the disintegration of the leaves and stalks of the hay, and heavier particles which are composed of the grains and other solid parts of the same. By reason of the differences in the weight or size of the constituents of the meal and the velocity with which they are impelled by the action of the fan, they are when discharged from the delivery conduit of the latter, separated according to their specific gravity, with the result that they are deposited in the sack or other receptacle into which said conduit discharges in separated quantities, and, where the end of the delivery conduit is placed at a distance above the receptacle into which the meal is deposited, it often occurs that the fine pulverous substance is blown away from the receptacle and only the heavier particles are received therein. Inasmuch as it is essential that before being used as a fodder for horses and cattle, the different constituents of the meal be in a thoroughly intermixed condition, I have provided means whereby the flow of matter delivered by action of the fan is retarded and the said matter is brought to a comparative state of rest before it reaches the receptacle into which the conduit discharges, so that when deposited therein, the heavy and light components of the product will be thoroughly intermixed. I accomplish this, the object of my invention, by the simple means illustrated in the accompanying drawings in the various views of which like parts are similarly designated and in which, Figure 1 is a vertical, central section through the retarding device at the end of a delivery conduit, Fig. 2, a transverse section along the line 2—2, Fig. 1, and Fig. 3, a similar section taken along the line 3—3, Fig. 1.

Referring to the drawings by numerical reference characters, 2 designates the end of the delivery conduit of a fan or other suction device, and 3 the retarding contrivance which is connected at the end thereof and which consists of a preferably cylindrical, axially upright case 13 placed transversely with relation to the said conduit. The case 13 whose upper and lower ends are contracted, is closed at its top while at its lower end it has an opening 4 for the discharge of material delivered into the case through the conduit 2. A transverse partition 5 divides the case into two compartments 6 and 7, the upper one of which has an opening for the connection of the end of the delivery conduit. The partition 5 has a circularly arranged series of openings 8 in adjacency to its peripheral edge and in connection with said openings, a plurality of downwardly extending nozzles 9, the lower extremities of which are bent toward the interior surface of the lower compartment 7, with their outlet openings centrally disposed in a circle concentric to said surface. The case 13 is furthermore provided above the discharge opening at its lower end, with a series of upright blades 10 which extend radially inwardly from the interior surface of its lower contracted portion.

The opening in the upper compartment 6 is arranged so that the delivery pipe of the fan when connected therein is in substantially tangential relation to the circumferential wall of the same, and the matter which is discharged through the conduit into the casing with great velocity, will consequently whirl along the interior cylindrical surface of the upper compartment to subsequently enter the nozzles through which it is emitted into the lower compartment and against the interior surface of the same along which it moves downwardly at a greatly reduced rate of speed until by engagement with the radial blades 10 it is brought to a comparative condition of rest before being discharged through the opening 4. The different constituents of the matter being thus retained to collect within the casing, are when discharged therefrom thoroughly intermixed irrespective of whatever difference there may be in their weight or size.

It will be understood that while in the drawings I have shown the case 13 as being separate from the conduit 2, the two parts may be formed integral with each other and that other variations in the construction and arrangement of the parts may be availed of within the spirit of my invention.

Having thus described my invention what I claim and desire to secure by Letters-Patent is:

1. A device of the class described comprising a case having an inlet opening in its upper portion and a single outlet which is provided by an opening at its lower end, an apertured transverse partition in said case disposed between said openings to obstruct the flow of material after it has entered the case through the inlet opening, and means for retarding the flow of material after it has passed through the apertures of the partition to prevent separation of its constituents before its discharge from the case through the outlet opening.

2. A device of the class described comprising a case having an inlet opening in its upper portion and a single outlet which is provided by an opening at its lower end, an apertured transverse partition in said case disposed between said openings to obstruct the flow of material after it has entered the case through the inlet opening, means for directing the material after it has passed through the apertures of the partition against the inner surface of the case below the partition to retard its flow by frictional contact with said surface and thus prevent separation of its constituents before it is discharged from the case through the outlet opening, and means at the lower end of the case for converting the circular motion of the material into a straight, downward flow before it reaches the said outlet opening.

3. A device of the class described comprising a case having an inlet opening in its upper portion and a single outlet which is provided by an opening at its lower end, an apertured transverse partition in said case disposed between said openings to obstruct the flow of material after it has entered the case through the inlet opening, nozzles extending downwardly from the apertures in the partition and curved at their lower ends toward the inner surface of the case for directing material after it has passed through the said apertures against the said inner surface to retard its flow by frictional contact with the same, and thus prevent separation of its constituents before it is discharged from the case through the outlet opening, and means at the lower end of the case for converting the circular motion of the material into a straight downward flow before it reaches the said outlet opening.

4. A device of the class described comprising a case having an inlet opening in its upper portion and a single outlet which is provided by an opening at its lower end, an apertured transverse partition in said case disposed between said openings to obstruct the flow of material after it has entered the case through the inlet opening, means for directing the material after it has passed through the apertures of the partition against the inner surface of the case below the latter to retard its flow by frictional contact with said surface, and thus prevent separation of its constituents before it is discharged from the case through the outlet opening, and blades extending inwardly from the inner surface of the case at its lower end to convert the circular motion of the material into a straight, downward flow before it reaches the said outlet opening.

In testimony whereof I have affixed my signature in presence of two witnesses.

SHERMAN C. ROBERTS.

Witnesses:
 G. J. ROLLANDET,
 P. RHOADES.

Copies of this patent may be obtained for five cents each, by addressing the "Commissioner of Patents, Washington, D. C."